US010554320B2

(12) United States Patent
Gao et al.

(10) Patent No.: US 10,554,320 B2
(45) Date of Patent: Feb. 4, 2020

(54) METHOD FOR MAPPING PACKET SERVICE ONTO OPTICAL TRANSPORT NETWORK (OTN), AND OTN DEVICE (71) Applicant: HUAWEI TECHNOLOGIES CO., LTD., Shenzhen, Guangdong (CN)

(72) Inventors: Hongjun Gao, Shenzhen (CN); Zhiyong Yan, Shenzhen (CN); Mingwei Liu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 33 days.

(21) Appl. No.: 15/856,715

(22) Filed: Dec. 28, 2017

(65) Prior Publication Data

US 2018/0123718 A1 May 3, 2018

Related U.S. Application Data (63) Continuation of application No. PCT/CN2015/082676, filed on Jun. 29, 2015.

(51) Int. Cl.
H04J 3/16 (2006.01)
(52) U.S. Cl.
CPC .................. H04J 3/1652 (2013.01)
(58) Field of Classification Search
CPC ....... H04J 2203/0012; H04J 2203/0082; H04J 3/1652; H04J 14/021; H04J 114/0257;
(Continued)

(56) References Cited

U.S. PATENT DOCUMENTS

2011/0135302 A1* 6/2011 Kang .................. H04L 45/62
398/43
2014/0334816 A1* 11/2014 Guo .................. H04Q 11/0003
398/45
(Continued)

FOREIGN PATENT DOCUMENTS

CN 103281263 A 9/2013
CN 103517332 A 1/2014
(Continued)

OTHER PUBLICATIONS

Extended European Search Report dated Mar. 9, 2018, in corresponding European Patent Application No. 15896657.2, 8 pgs.
(Continued)

Primary Examiner — Mewale A Ambaye
(74) Attorney, Agent, or Firm — Staas & Halsey LLP (57) ABSTRACT A method for mapping a packet service onto an optical transport network is disclosed. An embodiment of the method includes: receiving a packet service message from an access side, identifying the message by using a first board number of a first line board in which a first egress is located and a first port number of the first egress; sending the message to the first line board corresponding to the first board number; and encapsulating the message that is sent to the first line board, mapping the encapsulated message onto a first optical channel data unit ODU corresponding to the first port number, and sending the first ODU by using the first egress. Cross-connect scheduling of any bandwidth in any direction is implemented based on a packet service, and packet services on different tributary boards share different ODU timeslots or a same ODU timeslot on a same line board.

15 Claims, 5 Drawing Sheets (58) Field of Classification Search
CPC ..... H04J 14/0269; H04J 3/1658; H04L 45/62; H04L 49/351; H04L 12/56
See application file for complete search history.

(56) References Cited

U.S. PATENT DOCUMENTS

| | | | |
|---|---|---|---|
| 2015/0104178 A1* | 4/2015 | Su | H04B 10/27 398/79 |
| 2015/0236810 A1 | 8/2015 | Fu et al. | |
| 2015/0256258 A1* | 9/2015 | Fu | H04B 10/27 398/58 |

FOREIGN PATENT DOCUMENTS

| | | |
|---|---|---|
| CN | 103780327 A | 5/2014 |
| WO | 2014/059834 A1 | 4/2014 |

OTHER PUBLICATIONS

International Search Report dated Apr. 1, 2016 in corresponding International Patent Application No. PCT/CN2015/082676.
Written Opinion of the International Searching Authority dated Apr. 1, 2016 in corresponding International Patent Application No. PCT/CN2015/082676.
Chinese Office Action dated Jul. 23, 2018 in corresponding Chinese Patent Application No. 201580050759.3, 6 pgs.

* cited by examiner

METHOD FOR MAPPING PACKET SERVICE ONTO OPTICAL TRANSPORT NETWORK (OTN), AND OTN DEVICE

CROSS-REFERENCE TO RELATED APPLICATIONS

This application is a continuation of International Application No. PCT/CN2015/082676, filed on Jun. 29, 2015. The disclosure of the aforementioned application is hereby incorporated by reference in its entirety.

TECHNICAL FIELD

Embodiments of the present invention relate to the communications field, and in particular, to a method for mapping a packet service onto an optical transport network, and an OTN device.

BACKGROUND

With continuous development and service penetration of technologies such as cloud computing, ultra-wideband, triple play, and Internet of Things, an explosive traffic growth brought by multi-service development poses a new challenge to a network bandwidth. Currently, two types of transport devices oriented to a future carrier-grade Internet Protocol (IP) service are mainly proposed in the industry. One mainstream device is an Optical Transport Network (OTN) device. An OTN has a large-capacity and long-distance transport capability, and is capable of providing multiple protection manners and end-to-end monitoring management. The OTN device is based on a Time Division Multiplexing (TDM) technology, and has a minimum timeslot granularity of 1.25 Gbps when the OTN device is oriented to an IP/Ethernet service. The other mainstream device is a Packet Transport Network (PTN) device based on a packet-switched technology. A PTN can implement efficient bandwidth utilization, refined traffic management, and flexible packet switching. At present, to implement fiber sharing, flexible bandwidth adjustment, and flexible scheduling for an OTN service carried by the OTN service and a packet service carried by the PTN service, a transport requirement of the OTN device for carrying the packet service needs to be satisfied.

Figure 1:
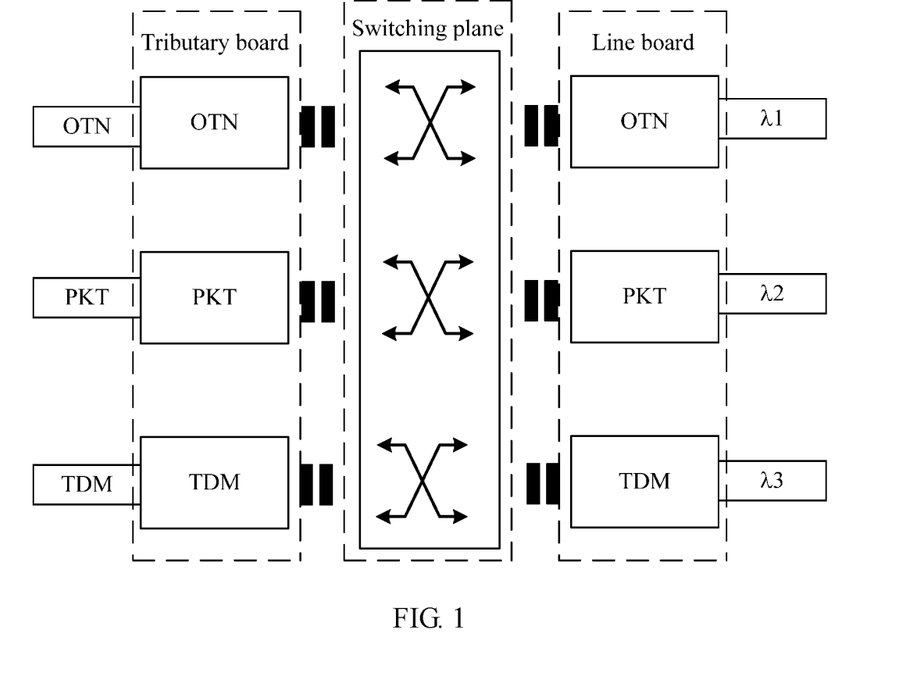
FIG. 1 is an architecture diagram of a system in which a packet is transmitted from a color optical module in an OTN in the prior art.
Figure 2:
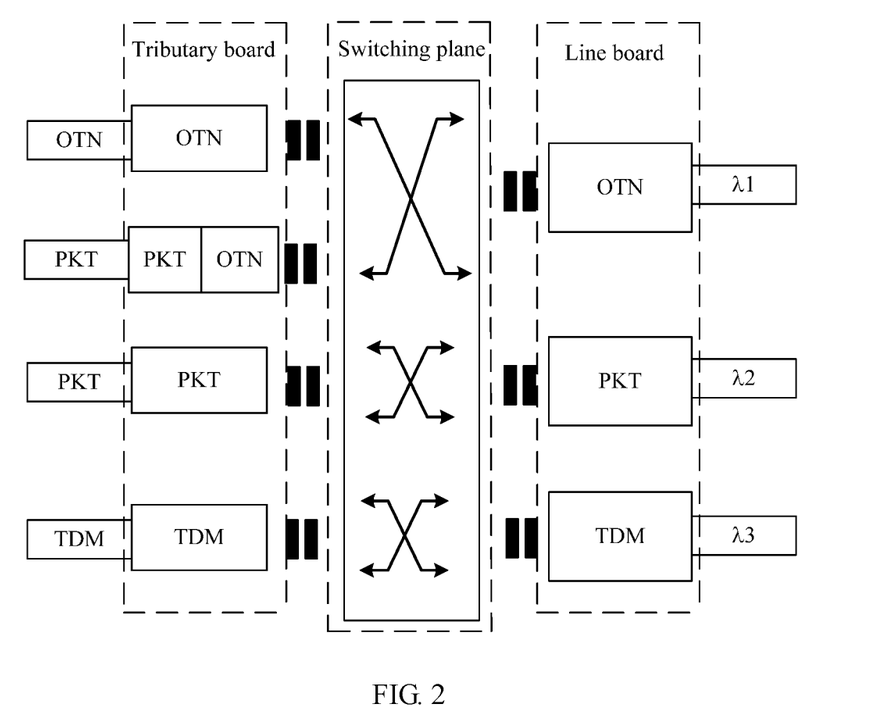
FIG. 2 is a system architecture diagram of board-level EOO in the prior art.

An existing packet (PKT) and OTN convergent device packet and optical transport network (POTN) features coexistence of multiple switching planes, but forwarding on different switching planes is independent. The POTN mainly supports two solutions of mapping a packet service onto the OTN. In one solution, a packet is transmitted from a color optical module in the OTN. As shown in FIG. 1, the multiple switching planes of the PKT and ONT convergent device perform forwarding independently, and on an egress of an OTN line board, the packet service is encapsulated by using a Generic Framing Procedure (GFP) and then mapped onto the OTN. In the other solution, a board-level Ethernet over OTN, (EOO) architecture is used. As shown in FIG. 2, on an access-side tributary board, an Ethernet packet service is encapsulated by using a GFP and then mapped onto an Optical Channel Data Unit (ODU) timeslot, and a switching plane of the OTN performs ODU-based cross-connect scheduling. The solution in which the packet is transmitted from the color optical module in the OTN cannot support transport of multiple services on the Optical Channel Data Unit (ODU), and cannot be applied to a multi-service OTN platform. The board-level EOO architecture supports the multi-service OTN platform, and is a mainstream solution.

However, the board-level EOO architecture is a board-level solution of mapping a packet service onto the OTN. Therefore, cross-connect scheduling by a switching plane on a cross-connect board is based on the ODU, and is limited by a size of a timeslot granularity (for example, a minimum switching granularity is ODU0). As a result, bandwidth management is not flexible, and a cross-connect scheduling direction is limited.

SUMMARY

In view of this, embodiments of the present invention provide a method for mapping a packet service onto an OTN, and an OTN device, to resolve a problem that a size of a packet service granularity and a cross-connect scheduling direction are limited in a process of mapping a packet service onto an OTN.

According to a first aspect, an embodiment of the present invention provides a method for mapping a packet service onto an optical transport network OTN, including: receiving a packet service message from an access side, and identifying the packet service message by using a first board number of a first line board in which a first egress is located and a first port number of the first egress; sending the packet service message to the first line board corresponding to the first board number; and encapsulating the packet service message that is sent to the first line board, mapping an encapsulated packet service message onto a first optical channel data unit ODU corresponding to the first port number, and sending the first ODU by using the first egress.

With reference to the first aspect, in a first possible implementation of the first aspect, the first port number is in a one-to-one correspondence with a number of the first ODU.

With reference to the first aspect or the first possible implementation of the first aspect, in a second possible implementation of the first aspect, the first ODU includes at least one first sub-port number of the first egress.

With reference to any one of the first aspect, or the first and the second possible implementations of the first aspect, in a third possible implementation of the first aspect, the method further includes: receiving the packet service message from a network side, demapping the packet service message from the first ODU, and decapsulating the packet service message; obtaining, according to the number of the first ODU and the at least one first sub-port number that is of the first egress and that is included in the first ODU, a second board number of a tributary board in which a second egress is located; and sending the packet service message to the tributary board corresponding to the second board number, and sending the packet service message by using the second egress.

With reference to any one of the first aspect, or the first to the third possible implementations of the first aspect, in a fourth possible implementation of the first aspect, a combination of the number of the first ODU and any first sub-port number included in the first ODU is uniquely corresponding to one second board number.

With reference to any one of the first aspect, or the first to the fourth possible implementations of the first aspect, in a fifth possible implementation of the first aspect, the obtaining, according to the number of the first ODU and the at least one first sub-port number that is of the first egress and that is included in the first ODU, a second board number of a tributary board in which a second egress is located further includes: obtaining a second port number of the second egress according to the number of the first ODU and the at least one first sub-port number that is of the first egress and that is included in the first ODU.

With reference to any one of the first aspect, or the first to the fifth possible implementations of the first aspect, in a sixth possible implementation of the first aspect, the method further includes: receiving the packet service message from a network side, demapping the packet service message from the first ODU, decapsulating the packet service message, and obtaining a third board number of a second line board in which a third egress is located and a third port number of the third egress according to the at least one first sub-port number that is of the first egress and that is included in the first ODU; sending the packet service message to the second line board corresponding to the third board number; and encapsulating the packet service message that is sent to the second line board, mapping an encapsulated packet service message onto a second ODU corresponding to the third port number, and sending the second ODU by using the third egress.

With reference to any one of the first aspect, or the first to the sixth possible implementations of the first aspect, in a seventh possible implementation of the first aspect, the first board number of the first line board in which the first egress is located and the first port number of the first egress are obtained by means of table lookup.

According to a second aspect, an embodiment of the present invention provides an optical transport network OTN device. The OTN device includes: a tributary board, a cross-connect board, and a first line board, where the tributary board is configured to receive a first packet service message from an access side, and identify the first packet service message by using a first board number of the first line board in which a first egress is located and a first port number of the first egress; the cross-connect board is configured to send the first packet service message to the first line board corresponding to the first board number; and the first line board is configured to encapsulate the first packet service message that is sent to the first line board, map an encapsulated first packet service message onto a first optical channel data unit ODU corresponding to the first port number, and send the first ODU by using the first egress.

With reference to the second aspect, in a first possible implementation of the second aspect, the first port number is in a one-to-one correspondence with a number of the first ODU.

With reference to the second aspect or the first possible implementation of the second aspect, in a second possible implementation of the second aspect, the first line board is further configured to receive a second packet service message from a network side, demap the second packet service message from a second ODU, and decapsulate the second packet service message; the first line board is further configured to obtain, according to a number of the second ODU and at least one second sub-port number that is of a second egress and that is included in the second ODU, a third board number of the tributary board in which a third egress is located; the cross-connect board is further configured to send the second packet service message to the tributary board corresponding to the third board number; and the tributary board sends the second packet service message by using the third egress.

With reference to any one of the second aspect, or the first and the second possible implementations of the second aspect, in a third possible implementation of the second aspect, a combination of the number of the second ODU and any second sub-port number included in the second ODU is uniquely corresponding to one third board number.

With reference to any one of the second aspect, or the first to the third possible implementations of the second aspect, in a fourth possible implementation of the second aspect, the first line board is further configured to obtain a third port number of the third egress according to the number of the second ODU and the at least one second sub-port number that is of the second egress and that is included in the second ODU.

With reference to any one of the second aspect, or the first to the fourth possible implementations of the second aspect, in a fifth possible implementation of the second aspect, the OTN device further includes a second line board, where the first line board is configured to receive a third packet service message from a network side, demap the third packet service message from a third ODU, decapsulate the third packet service message, and obtain a fifth board number of the second line board in which a fifth egress is located and a fifth port number of the fifth egress according to at least one fourth sub-port number that is of a fourth egress and that is included in the third ODU; the cross-connect board is configured to send the third packet service message to the second line board corresponding to the fifth board number; and the second line board encapsulates the third packet service message that is sent to the second line board, maps an encapsulated third packet service message onto a fourth ODU corresponding to the fifth port number, and sends the fourth ODU by using the fifth egress.

With reference to any one of the second aspect, or the first to the fifth possible implementations of the second aspect, in a sixth possible implementation of the second aspect, the first board number of the first line board in which the first egress is located and the first port number of the first egress are obtained by means of table lookup.

According to the technical solutions provided in the embodiments of the present invention, the tributary board receives the packet service message from the access side, and identifies the packet service message by using the first board number of the first line board in which the first egress is located and the first port number of the first egress; the cross-connect board sends the packet service message to the line board corresponding to the first board number; and the line board maps the packet service message onto the ODU corresponding to the first port number. Cross-connect scheduling of any bandwidth in any direction is implemented based on a packet service, and packet services on different tributary boards share different ODU timeslots or a same ODU timeslot on a same line board.

BRIEF DESCRIPTION OF DRAWINGS

To describe the technical solutions in the embodiments of the present invention or in the prior art more clearly, the following briefly describes the accompanying drawings required for describing the background and the embodiments. Apparently, the accompanying drawings in the following description show merely some embodiments of the present invention, and a person of ordinary skill in the art may still derive other accompanying drawings or embodiments according to these drawings or description without creative efforts, and the present invention aims to cover all these derived accompanying drawings or embodiments.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 3:
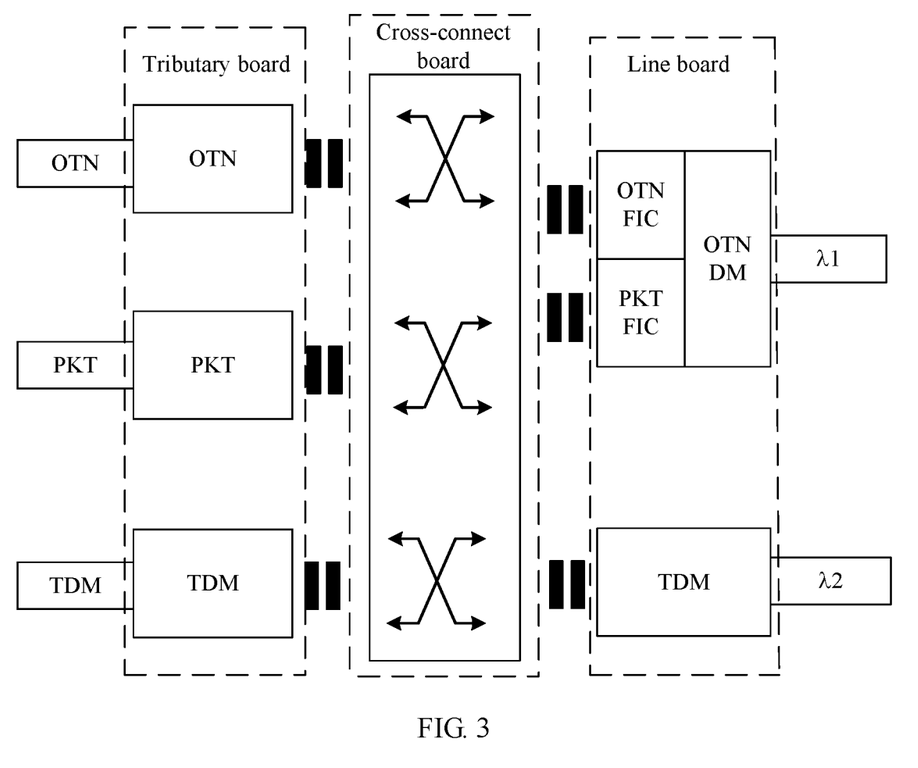
FIG. 3 is a system architecture diagram of one type of distributed EOO according to an embodiment of the present invention.

FIG. 3 is a system architecture diagram of one type of distributed EOO according to an embodiment of the present invention. As shown in FIG. 3, a system architecture of the distributed EOO mainly includes a tributary board, a cross-connect board, and a line board.

The tributary board may include an OTN tributary board, a PKT tributary board, and a TDM tributary board. Specifically, the tributary board may be configured to complete functions such as message parsing, service processing, priority processing, and message editing and modification. Multiple switching planes are formed on the cross-connect board, for example, an OTN switching plane, a PKT switching plane, and a TDM switching plane. The cross-connect board is configured to perform cross-connect service scheduling between the tributary board and the line board. Correspondingly, the line board may include an OTN line board, a PKT line board, and a TDM line board. In this embodiment of the present invention, the OTN line board is configured to map a packet service onto an OTN. In a distributed EOO system, a packet service may be transmitted by using a message or a cell as a data unit. In the following, a data unit of the packet service is indicated by using a packet service message or a packet service cell. The OTN line board may include the following several modules: a PKT Fabric Interface Controller (FIC), an OTN FIC, and OTN Data Mapping (DM). Specifically, during uplink packet service processing, the PKT FIC receives a packet service cell and sorts the cell. During downlink packet service processing, the PKT FIC fragments the packet service message into a cell, and then forwards the cell by using the PKT switching plane. During uplink OTN service processing, the OTN FIC receives an OTN service cell and sorts the cell. During downlink OTN service processing, the OTN FIC fragments an OTN data frame into a cell, and then forwards the cell by using the OTN switching plane. The OTN DM may encapsulate the packet service message and then map an encapsulated packet service message onto a corresponding ODU. The ODU may be specifically an ODUk (k may be a positive integer, such as 0, 1, 2, 3, or 4).

Figure 4:
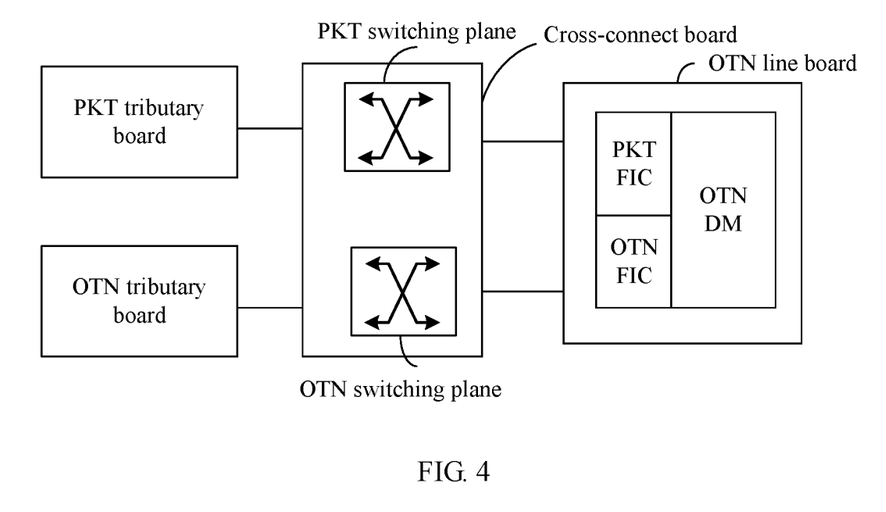
FIG. 4 is a system architecture diagram of another type of distributed EOO according to an embodiment of the present invention.

FIG. 4 is a system architecture diagram of another type of distributed EOO according to an embodiment of the present invention. As shown in FIG. 4, an uplink service is used as an example for description. After a packet service message of an access side enters a PKT tributary board, the PKT tributary board performs message parsing, service processing, priority processing, message editing and modification, and the like on the packet service message. After the PKT tributary board fragments the packet service message into a cell, a PKT switching plane on a cross-connect board performs PKT-based cross-connect scheduling. The PKT switching plane sends the packet service cell to an OTN line board. In addition, after an OTN service data frame of the access side enters an OTN tributary board, the OTN tributary board performs encapsulation and mapping processing on the OTN data frame. After the OTN tributary board fragments the OTN data frame into a cell, an OTN switching plane on the cross-connect board performs ODU-based cross-connect scheduling. The OTN switching plane sends the OTN service cell to the OTN line board. After receiving and sorting the packet service cell, the OTN line board performs packet assembly, performs GFP encapsulation on the packet service message, and then maps an encapsulated packet service message onto a specified ODU timeslot. An Optical Transform Unit (OTU) signal is formed after mapping processing is performed on the packet service message, and is output from a network side. In addition, after receiving the OTN service cell, the OTN line board sorts the OTN service cell to reassemble the OTN data frame. An OTU signal is formed after processing is performed on the OTN data frame, and is output from the network side.

Figure 5:
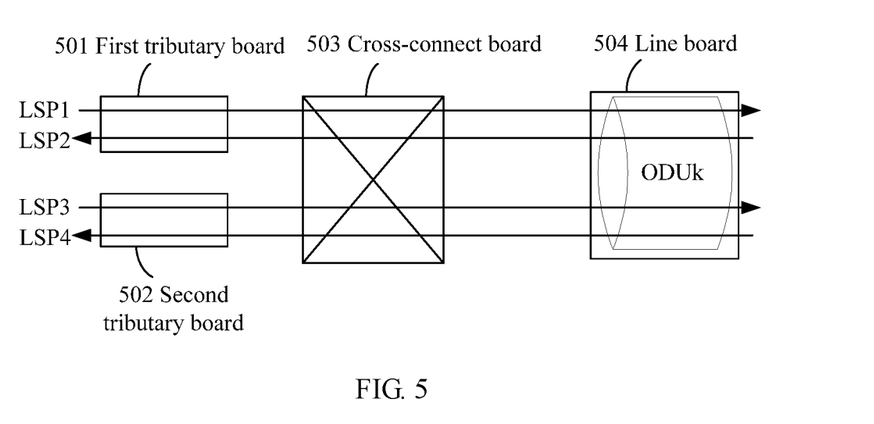
FIG. 5 is a schematic structural diagram of a system for mapping a packet service onto an OTN according to an embodiment of the present invention.

FIG. 5 is a schematic structural diagram of a system for mapping a packet service onto an OTN according to an embodiment of the present invention. As shown in FIG. 5, the system for mapping a packet service onto an OTN mainly includes a first tributary board 501, a second tributary board 502, a cross-connect board 503, and a line board 504. Specifically, the first tributary board 501 may be a PKT tributary board, and the second tributary board 502 may be an OTN tributary board. Multiple switching planes may be formed on the cross-connect board 503, for example, a PKT switching plane and an OTN switching plane. The line board 504 may be an OTN line board. In FIG. 5, an LSP 1 and an LSP 2 may indicate packet services, and an LSP 3 and an LSP 4 may indicate OTN services.

A packet service may be input from an access side, or may be input from a network side. A packet service from the PKT tributary board to the OTN line board is an uplink service. A packet service from the OTN line board to the PKT tributary board is a downlink service.

In a specific implementation process, a processing procedure of the uplink packet service from the PKT tributary board to the OTN line board includes the following.

1. Processing of the Packet Service on the PKT Tributary Board

After receiving a packet service message from the access side, the PKT tributary board performs message parsing, service processing, priority processing, and message editing and modification on the packet service message. Message parsing includes determining a message type, for example, determining that the message type is an Ethernet message or an Multi-Protocol Label Switching (MPLS) message. Message parsing further includes determining a service processing manner. The service processing manner includes dedicated-line processing, layer 2 processing, layer 3 processing, and the like. Dedicated-line processing includes message forwarding according to a port number of an ingress, or message forwarding according to a port number of an ingress and a Virtual Local Area Network Identifier (VLAN ID). Layer 2 processing includes message forwarding according to a Destination Address (DA). Layer 3 processing includes message forwarding according to an IP address. Priority processing includes scheduling and/or discarding performed during message congestion. Message editing and modification includes modifying a priority of a message, adding one layer of VLAN, adding an MPLS label, modifying a DA and an Source Address (SA), performing message fragmentation processing, and the like.

After performing message parsing and service processing on the packet service message, the PKT tributary board may obtain message information by means of table lookup, for example, including a board number of an egress, a port number of the egress, and a sub-port number of the egress. For example, table lookup may be performed according to a port number of an ingress and/or a VLAN ID, or table lookup may be performed according to a DA, an IP address, and the like, to obtain the board number of the egress, the port number of the egress, and the sub-port number of the egress. When editing and modifying the message, the PKT tributary board may identify the message by using the board number of the egress and the port number of the egress, and may further add information about the sub-port number of the egress to the message. Specifically, the board number of the egress, the port number of the egress, and the sub-port number of the egress may be carried in a frame header of the message. By using the PKT switching plane on the cross-connect board, the packet service message is transferred from the PKT tributary board to the OTN line board according to frame header information carried in the message, where the frame header information includes, for example, the board number of the egress, the port number of the egress, and the sub-port number of the egress, and may further include priority information. The sub-port number of the egress may be encapsulated according to a Virtual Local Area Network (VLAN) or an Label Switched Path (LSP). Specifically, for the uplink packet service, an ingress is located on the PKT tributary board, and an egress is located on the OTN line board.

If VLAN-based encapsulation is performed, the sub-port number of the egress is indicated by using a VLAN format, as shown in Table 1.

TABLE 1

| DA | SA | Sub-port number of the egress (VLAN) | Payload | FCS |
|----|----|---|---|---|

If LSP-based encapsulation is performed, the sub-port number of the egress is indicated by using an MPLS label, as shown in Table 2.

TABLE 2

| Sub-port number of the egress (LSP) | DA | SA | Payload | FCS |
|---|----|----|---|---|

The DA indicates a destination address for message forwarding. The SA indicates a source address for message forwarding. The payload indicates a payload part of the message. The Frame Check Sequence (FCS) indicates a parity bit of the message.

The PKT tributary board performs rate limiting and shaping on traffic of the packet service message according to a configured bandwidth of a sub-port of the egress. The PKT tributary board fragments the packet service message into a cell, and the PKT switching plane performs cross-connect scheduling. The PKT switching plane sends the packet service cell to the OTN line board. The cell includes a fixed-length cell and a variable-length cell. Fragmenting the message into the cell is intended for more evenly message delivery.

2. Processing of the Packet Service on the OTN Line Board

The OTN line board receives the packet service cell from the PKT switching plane, sorts the cell, and then performs packet assembly, so that the packet service message is restored to a message format before the packet service message is fragmented into the cell. The port number of the egress is in a one-to-one correspondence with an ODU number. Therefore, after GFP encapsulation, the message may be mapped onto a specified ODU according to port number information that is of the egress and that is carried in a header of the message. For example, after encapsulating the packet service message, the OTN line board maps an encapsulated packet service message onto a specified ODU 2.

In a specific implementation process, a processing procedure of the downlink packet service from the OTN line board to the PKT tributary board includes the following.

1. Processing of the Packet Service on the OTN Line Board

The OTN line board receives a packet service message from the network side, and performs GFP demapping and decapsulation on the received packet service message, to obtain a sub-port number that is of an egress and that is carried in the message. Specifically, the sub-port number of the egress herein may be a sub-port number that is of the egress and that is added on the PKT tributary board during uplink processing of the packet service message. Egress information may be obtained by means of table lookup according to a combination of an ODU number and the sub-port number of the egress that are carried in the message. For example, the egress information includes a board number of the egress, and may further include a port number of the egress. The board number of the egress and the port number of the egress herein are used to indicate the PKT tributary board to which the packet service message is transferred.

Specifically, an ODU may include different sub-port numbers of an egress. Messages with different sub-port numbers of an egress are destined for different PKT tributary boards. Different ODUs may include a same sub-port number of the egress. Therefore, the board number of the egress and the port number of the egress need to be obtained by means of table lookup with reference to the ODU number and the sub-port number of the egress. Specifically, the OTN line board stores, in a form of a data structure such as a linear table or a hash table, a correspondence between the combination of the ODU number and the sub-port number of the egress, the board number of the egress, and the port number of the egress. Optionally, if no sub-port number of the egress is carried in the message, the ODU number may be used as the sub-port number of the egress for processing.

The OTN line board fragments the packet service message into a cell, and the PKT switching plane performs cross-connect scheduling, so that the packet service is transferred from the OTN line board to the PKT tributary board. The PKT switching plane sends the packet service cell to the PKT tributary board corresponding to the board number of the egress. Specifically, for the downlink packet service, an ingress is located on the OTN line board, and the outgoing port is located on the PKT tributary board.

2. Processing of the Packet Service on the PKT Tributary Board

The PKT tributary board receives the packet service cell from the PKT switching plane, sorts the cell, and then performs packet assembly, so that the packet service message is restored to a message format before the packet service message is fragmented into the cell. After performing message parsing, service processing, priority processing, and message editing and modification on the packet service message, the PKT tributary board outputs the message from a corresponding Ethernet port on the PKT tributary board according to information, for example, a DA, carried in the message. A process of performing message parsing, service processing, priority processing, and message editing and modification on the packet service message is the same as the processing procedure of the uplink packet service on the PKT tributary board. Details are not described herein again.

In this embodiment of the present invention, the PKT tributary board adds the port number of the egress to the packet service message, and the OTN line board maps the packet service message onto the corresponding ODU according to the port number of the egress in the message. This implements cross-connect scheduling of any bandwidth in any direction based on a packet service, and packet services on different tributary boards share different ODU timeslots on a same line board, or may share a same ODU timeslot on a same line board.

Figure 6:
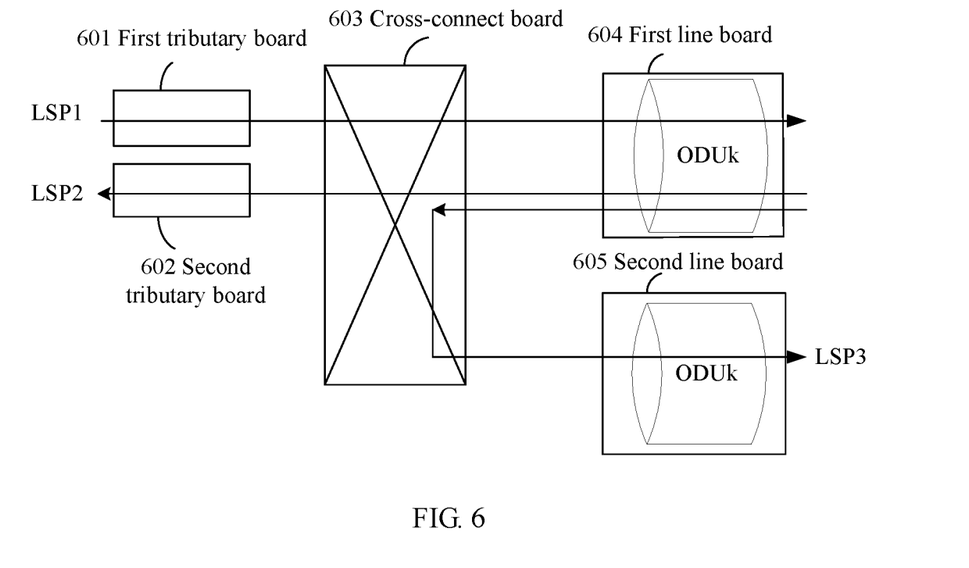
FIG. 6 is a schematic structural diagram of another system for mapping a packet service onto an OTN according to an embodiment of the present invention.

FIG. 6 is a schematic structural diagram of another system for mapping a packet service onto an OTN according to an embodiment of the present invention. As shown in FIG. 6, the system for mapping a packet service onto an OTN mainly includes a first tributary board 601, a second tributary board 602, a cross-connect board 603, a first line board 604, and a second line board 605. Specifically, the first tributary board 601 may be an OTN tributary board, and the second tributary board 602 may be a PKT tributary board. Multiple switching planes may be formed on the cross-connect board 603, for example, a PKT switching plane and an OTN switching plane. The first line board 604 and the second line board 605 may be OTN line boards. In FIG. 6, an LSP 1, an LSP 2, and an LSP 3 may indicate packet services.

In a specific implementation process, a processing procedure of a packet service from a source OTN line board to a destination OTN line board includes the following.

1. Processing of the Packet Service on the Source OTN Line Board

The first line board 604 may be the source OTN line board. After receiving a packet service message from a network side, the source OTN line board performs GFP demapping and decapsulation on the received packet service message, to obtain a sub-port number that is of an egress and that is carried in the message. Specifically, a sub-port number of the egress herein may be a sub-port number that is of the egress and that is added on the PKT tributary board during uplink processing of the packet service message. Egress information is obtained by means of table lookup according to a combination of an ODU number and the sub-port number of the egress that are carried in the message. For example, the egress information includes a board number of the egress, and may further include a port number of the egress. The board number of the egress and the port number of the egress herein are used to indicate the destination OTN line board or the PKT tributary board to which the packet service message is transferred. For example, in FIG. 6, the LSP 2 is transferred to the PKT tributary board, and the LSP 3 is transferred to the OTN line board.

Specifically, an ODU may include different sub-port numbers of an egress. Messages with different sub-port numbers of an egress are destined for different OTN line boards or PKT tributary boards. Different ODUs may include a same sub-port number of the egress. Therefore, the board number of the egress and the port number of the egress need to be obtained by means of table lookup with reference to the ODU number and the sub-port number of the egress. Specifically, the OTN line board stores, in a form of a data structure such as a linear table or a hash table, a correspondence between the combination of the ODU number and the sub-port number of the egress, the board number of the egress, and the port number of the egress. Optionally, if no sub-port number of the egress is carried in the message, the ODU number may be used as the sub-port number of the egress for processing. Optionally, a new sub-port number of the egress may further be obtained according to the ODU number and the sub-port number of the egress that are in the message, and the original sub-port number of the egress is replaced with the new sub-port number of the egress.

The OTN line board fragments the message into a cell, and then sends the cell to the destination OTN line board by using the PKT switching plane. Specifically, in a process in which the packet service is transferred from the source OTN line board to the destination OTN line board, an ingress is located on the source OTN line board, and the outgoing port is located on the destination OTN line board.

2. Processing of the Packet Service on the Destination OTN Line Board

The second line board 605 may be the destination OTN line board. The destination OTN line board performs packet assembly after sorting the cell, performs GFP encapsulation on the message, and maps an encapsulated message onto a specified ODU according to the port number that is of the egress and that is carried in a header of the message. For example, after encapsulating the packet service message, the destination OTN line board maps an encapsulated packet service message onto a specified ODU 2.

In this embodiment of the present invention, the source OTN line board transfers the packet service to the destination OTN line board, and the destination OTN line board maps the packet message to the corresponding ODU according to the port number of the egress. This implements cross-connect scheduling of any bandwidth in any direction based on a packet service, and different ODU timeslots on a same line board or a same ODU timeslot on a same line board may be shared between different line boards and between a line board and a tributary board.

Figure 7:
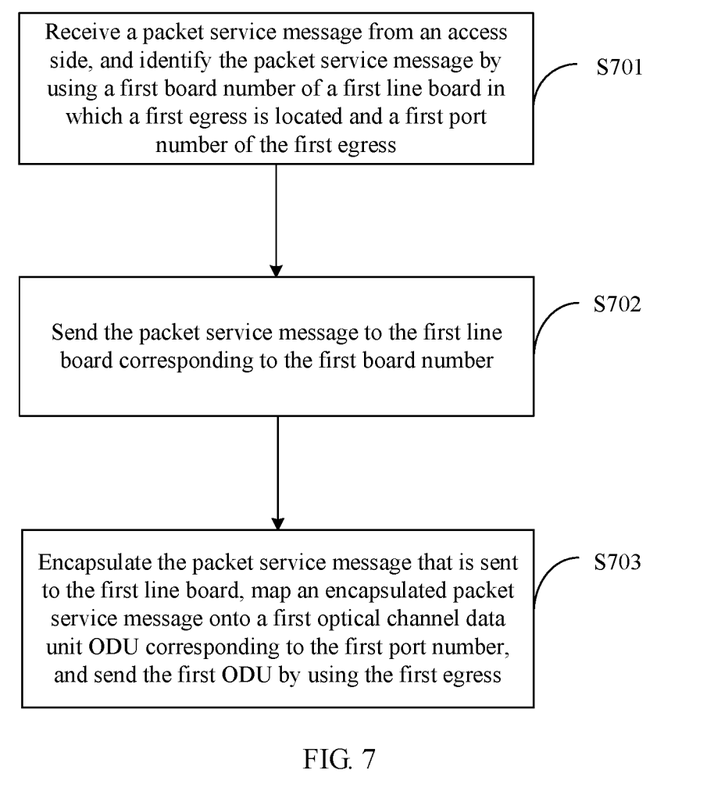
FIG. 7 is an exemplary flowchart of a method for mapping a packet service onto an OTN according to an embodiment of the present invention.

FIG. 7 is an exemplary flowchart of a method for mapping a packet service onto an OTN according to an embodiment of the present invention. As shown in FIG. 7, the method may be executed by a transport network device. Specifically, the method may be executed by an OTN device, and includes the following steps.

S701: Receive a packet service message from an access side, and identify the packet service message by using a first board number of a first line board in which a first egress is located and a first port number of the first egress.

Specifically, the first board number of the first line board in which the first egress is located and the first port number of the first egress may be obtained by means of table lookup. For example, table lookup is performed according to a DA, an IP address, and the like that are carried in the packet service message.

S702: Send the packet service message to the first line board corresponding to the first board number.

Specifically, when the packet service message is sent to a line board from a tributary board, a cross-connect board may perform cross-connect scheduling, to send the packet service message to a line board corresponding to the first board number carried in the packet service message.

S703: Encapsulate the packet service message that is sent to the first line board, map an encapsulated packet service message onto a first optical channel data unit ODU corresponding to the first port number, and send the first ODU by using the first egress.

In a specific implementation process, the first port number of the first egress may be in a one-to-one correspondence with a number of the first ODU. Because the first port number of the first egress is in a one-to-one correspondence with an ODU number, the line board encapsulates and maps the packet service message onto the corresponding ODU according to the first port number carried in the message.

During uplink packet service processing, that is, when the packet service is from the tributary board to the line board, an ingress is located on the tributary board, and an egress is located on the line board. Therefore, during uplink packet service processing, the first egress is located on the line board.

During downlink packet service processing, that is, when the packet service is from the line board to the tributary board, an ingress is located on the line board, and an egress is located on the tributary board. Optionally, during downlink packet service processing, some packet services are from a source line board to a destination line board. In this case, an ingress is located on the source line board, and an egress is located on the destination line board. Specifically, the source line board receives a packet service message from a network side, demaps the packet service message from an ODU, and decapsulates the packet service message, to obtain a first sub-port number that is of a first egress and that is carried in the message. Specifically, the first sub-port number of the first egress herein may be a sub-port number added on the tributary board during uplink processing before downlink processing of the packet service message. Different ODUs may include multiple same sub-port numbers of the first egress. Therefore, a second board number of the tributary board or the line board in which a corresponding second egress is located and a second port number of the second egress need to be determined with reference to an ODU number and the first sub-port number. The second egress herein is located on the tributary board or the destination line board to which the packet service is transferred.

Specifically, when the packet service is from the line board to the tributary board, the line board demaps, according to a packet service message received from a network side, the packet service message from a first ODU, and decapsulates the packet service message. The second board number of the tributary board in which the second egress is located is obtained according to a number of the first ODU and at least one first sub-port number that is of the first egress and that is included in the first ODU. The cross-connect board sends the packet service message to the tributary board corresponding to the second board number. The tributary board sends the packet service message by using the second egress. Specifically, a combination of the number of the first ODU and any first sub-port number included in the first ODU is uniquely corresponding to one second board number. A second port number of the second egress may further be obtained according to the number of the first ODU and the at least one first sub-port number that is of the first egress and that is included in the first ODU. The second egress is located on the tributary board.

When the packet service is from the source line board to the destination line board, the source line board receives the packet service message from the network side, demaps the packet service message from the first ODU, decapsulates the packet service message, and obtains a third board number of the destination line board in which a third egress is located and a third port number of the third egress according to at least one first sub-port number that is of the first egress and that is included in the first ODU. The cross-connect board sends the packet service message to the destination line board corresponding to the third board number. The destination line board encapsulates the packet service message that is sent to the destination line board, maps an encapsulated packet service message onto a second ODU corresponding to the third port number, and sends the second ODU by using the third egress. The third egress is located on the destination line board.

In this embodiment of the present invention, the tributary board receives the packet service message, and identifies the packet service message by using the first board number of the line board in which the first egress is located and the first port number of the first egress; the tributary board sends the packet service message to the line board corresponding to the first board number; and the line board encapsulates the packet service message, and maps an encapsulated packet service message onto the first ODU corresponding to a first port number. This implements cross-connect scheduling of any bandwidth in any direction based on a packet service, and packet services on different tributary boards share different ODU timeslots or a same ODU timeslot on a same line board.

Figure 8:
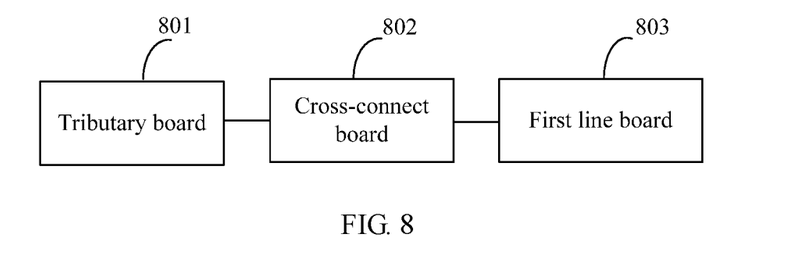
FIG. 8 is a schematic diagram of a logical structure of an OTN device according to an embodiment of the present invention.

FIG. 8 is a schematic diagram of a logical structure of an OTN device according to an embodiment of the present invention. As shown in FIG. 8, the OTN device includes a tributary board 801, a cross-connect board 802, and a first line board 803.

In a specific implementation process, the tributary board 801 is configured to receive a first packet service message from an access side, and identify the first packet service message by using a first board number of the first line board 803 in which a first egress is located and a first port number of the first egress.

Specifically, the first board number of the first line board 803 in which the first egress is located and the first port number of the first egress may be obtained by means of table lookup. For example, table lookup is performed according to a DA, an IP address, and the like that are carried in a packet service message.

The cross-connect board 802 is configured to send the first packet service message to the first line board 803 corresponding to the first board number.

Specifically, when the packet service message is sent to the first line board 803 from the tributary board 801, the cross-connect board 802 may perform cross-connect scheduling, to send the packet service message to the first line board 803 corresponding to the first board number carried in the packet service message.

The first line board 803 is configured to encapsulate the first packet service message that is sent to the first line board

803, map an encapsulated first packet service message onto a first optical channel data unit ODU corresponding to the first port number, and send the first ODU by using the first egress.

In a specific implementation process, the first port number of the first egress may be in a one-to-one correspondence with a number of the first ODU. Because the first port number of the first egress is in a one-to-one correspondence with an ODU number, the first line board 803 encapsulates and maps the packet service message onto the corresponding ODU according to the first port number carried in the message.

During uplink packet service processing, that is, when the packet service is from the tributary board 801 to the first line board 803, an ingress is located on the tributary board 801, and an egress is located on the first line board 803. Therefore, during uplink packet service processing, the first egress is located on the first line board 803.

During downlink packet service processing, that is, when the packet service is from the first line board 803 to the tributary board 801, an ingress is located on the first line board 803, and an egress is located on the tributary board 801. Optionally, during downlink packet service processing, some packet services are from a source line board to a destination line board. In this case, an ingress is located on the source line board, and an egress is located on the destination line board. Specifically, the source line board receives a packet service message from a network side, demaps the packet service message from an ODU, and decapsulates the packet service message, to obtain a second sub-port number that is of a second egress and that is carried in the message. Specifically, the second sub-port number of the second egress herein may be a sub-port number added on the tributary board 801 during uplink processing before downlink processing of the packet service message. Different ODUs may include multiple same second sub-port numbers. Therefore, a third board number of a tributary board or a destination line board in which a corresponding third egress is located and a third port number of the third egress need to be determined with reference to an ODU number and the second sub-port number. The third egress herein is located on the tributary board or the destination line board to which the packet service is transferred.

Specifically, when the packet service is from the first line board 803 to the tributary board 801, the first line board 803 is further configured to receive a second packet service message from the network side, demap the second packet service message from a second ODU, and decapsulate the second packet service message. The first line board 803 is further configured to obtain, according to a number of the second ODU and at least one second sub-port number that is of the second egress and that is included in the second ODU, the third board number of the tributary board in which the third egress is located. The cross-connect board 802 is further configured to send the second packet service message to the tributary board 801 corresponding to the third board number. The tributary board 801 sends the second packet service message by using the third egress. Specifically, a combination of the number of the second ODU and any second sub-port number included in the second ODU is uniquely corresponding to one third board number. The third port number of the third egress may further be obtained according to the number of the second ODU and the at least one second sub-port number that is of the second egress and that is included in the second ODU. The second sub-port number may be added during uplink processing before downlink processing of the second packet service message. The third egress is located on the tributary board 801.

When the packet service is from the source line board to the destination line board, specifically, the source line board is the first line board 803, and the destination line board is a second line board. The first line board 803 and the second line board may be located on a same OTN device, or may be located on different OTN devices. The first line board 803 is configured to receive a third packet service message from the network side, demap the third packet service message from a third ODU, decapsulate the third packet service message, and obtain a fifth board number of the second line board in which a fifth egress is located and a fifth port number of the fifth egress according to at least one fourth sub-port number that is of a fourth egress and that is included in the third ODU. The cross-connect board 802 is configured to send the third packet service message to the second line board corresponding to the fifth board number. The second line board encapsulates the third packet service message that is sent to the second line board, maps an encapsulated third packet service message onto a fourth ODU corresponding to the fifth port number, and sends the fourth ODU by using the fifth egress. Specifically, a combination of a number of the third ODU and any fourth sub-port number included in the third ODU is uniquely corresponding to one third board number. The fourth sub-port number may be added during uplink processing before downlink processing of the third packet service message. The fifth egress is located on the destination line board.

In this embodiment of the present invention, the tributary board receives the first packet service message, and identifies the first packet service message by using the first board number of the first line board in which the first egress is located and the first port number of the first egress; the tributary board sends the first packet service message to the first line board corresponding to the first board number; and the first line board encapsulates the first packet service message, and maps an encapsulated first packet service message onto the first ODU corresponding to a first port. This implements cross-connect scheduling of any bandwidth in any direction based on a packet service, and packet services on different tributary boards share different ODU timeslots or a same ODU timeslot on a same line board.

A person of ordinary skill in the art may understand that, each aspect of the present invention or a possible implementation of each aspect may be specifically implemented as a system, a method, or a computer program product. Therefore, each aspect of the present invention or a possible implementation of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation of each aspect may take a form of a computer program product, where the computer program product is computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a user computer while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for mapping a packet service onto an optical transport network (OTN), comprising:
   receiving a packet service message from an access side, and identifying the packet service message by using a first board number of a first line board in which a first egress is located and a first port number of the first egress;
   sending the packet service message to the first line board corresponding to the first board number; and
   encapsulating the packet service message that is sent to the first line board, mapping an encapsulated packet service message onto a first optical channel data unit (ODU) corresponding to the first port number, and sending the first ODU by using the first egress.

2. The method according to claim 1, wherein the first port number is in a one-to-one correspondence with a number of the first ODU.

3. The method according to claim 1, wherein the first ODU comprises at least one first sub-port number of the first egress.

4. The method according to claim 3, wherein the method further comprises:

receiving the packet service message from a network side, demapping the packet service message from the first ODU, and decapsulating the packet service message;
obtaining, according to the number of the first ODU and the at least one first sub-port number that is of the first egress and that is comprised in the first ODU, a second board number of a tributary board in which a second egress is located; and
sending the packet service message to the tributary board corresponding to the second board number, and sending the packet service message by using the second egress.

5. The method according to claim 1, wherein:
a combination of the number of the first ODU and any first sub-port number comprised in the first ODU is uniquely corresponding to one second board number.

6. The method according to claim 4, wherein the obtaining, according to the number of the first ODU and the at least one first sub-port number that is of the first egress and that is comprised in the first ODU, a second board number of a tributary board in which a second egress is located further comprises:
obtaining a second port number of the second egress according to the number of the first ODU and the at least one first sub-port number that is of the first egress and that is comprised in the first ODU.

7. The method according to claim 3, wherein the method further comprises:
receiving the packet service message from a network side, demapping the packet service message from the first ODU, decapsulating the packet service message, and obtaining a third board number of a second line board in which a third egress is located and a third port number of the third egress according to the at least one first sub-port number that is of the first egress and that is comprised in the first ODU;
sending the packet service message to the second line board corresponding to the third board number; and
encapsulating the packet service message that is sent to the second line board, mapping an encapsulated packet service message onto a second ODU corresponding to the third port number, and sending the second ODU by using the third egress.

8. The method according to claim 1, wherein the first board number of the first line board in which the first egress is located and the first port number of the first egress are obtained by means of table lookup.

9. An optical transport network (OTN) device, comprising:
   a memory; and
   a processor coupled to the memory and configured to:
   receive a first packet service message from an access side, and identify the first packet service message by using a first board number of a first line board in which a first egress is located and a first port number of the first egress;
   send the first packet service message to the first line board corresponding to the first board number; and
   encapsulate the first packet service message that is sent to the first line board, map an encapsulated first packet service message onto a first optical channel data unit (ODU) corresponding to the first port number, and send the first ODU by using the first egress.

10. The OTN device according to claim 9, wherein the first port number is in a one-to-one correspondence with a number of the first ODU.

11. The OTN device according to claim 9, wherein the processor is further configured to:

receive a second packet service message from a network side, demap the second packet service message from a second ODU, and decapsulate the second packet service message;

obtain, according to a number of the second ODU and at least one second sub-port number that is of a second egress and that is comprised in the second ODU, a third board number of the tributary board in which a third egress is located;

the second packet service message to the tributary board corresponding to the third board number; and send the second packet service message by using the third egress.

12. The OTN device according to claim 11, wherein:
a combination of the number of the second ODU and any second sub-port number comprised in the second ODU is uniquely corresponding to one third board number.

13. The OTN device according to claim 11, wherein the processor is further configured to:
obtain a third port number of the third egress according to the number of the second ODU and the at least one second sub-port number that is of the second egress and that is comprised in the second ODU.

14. The OTN device according to claim 9, wherein the processor is further configured to:
receive a third packet service message from a network side, demap the third packet service message from a third ODU, decapsulate the third packet service message, and obtain a fifth board number of the second line board in which a fifth egress is located and a fifth port number of the fifth egress according to at least one fourth sub-port number that is of a fourth egress and that is comprised in the third ODU;

send the third packet service message to the second line board corresponding to the fifth board number; and encapsulate the third packet service message that is sent to the second line board, map an encapsulated third packet service message onto a fourth ODU corresponding to the fifth port number, and send the fourth ODU by using the fifth egress.

15. The OTN device according to claim 9, wherein the first board number of the first line board in which the first egress is located and the first port number of the first egress are obtained by means of table lookup.

* * * * *